United States Patent [19]

Laig-Hörstebrock

[11] 4,084,039
[45] Apr. 11, 1978

[54] GAS VENTING BATTERY PLUG

[75] Inventor: Helmut Laig-Hörstebrock, Frankfurt am Main, Germany

[73] Assignee: Varta Batterie Aktiengesellschaft, Germany

[21] Appl. No.: 694,350

[22] Filed: Jun. 9, 1976

[30] Foreign Application Priority Data

May 14, 1976 Germany .............................. 2621413

[51] Int. Cl.² ............................................. H01M 2/12
[52] U.S. Cl. .................................................... 429/89
[58] Field of Search .............................. 429/82, 86, 89

[56] References Cited

U.S. PATENT DOCUMENTS

| 1,459,121 | 6/1923 | Wiel | 429/89 |
| 2,437,145 | 3/1948 | Woodbridge | 429/86 |
| 2,810,777 | 10/1957 | Brandt | 429/89 |
| 3,385,467 | 5/1968 | Lindenberg | 429/89 |

FOREIGN PATENT DOCUMENTS 467,326   6/1914   France .................................. 429/89

Primary Examiner—Donald L. Walton
Attorney, Agent, or Firm—Weiser, Stapler & Spivak

[57] ABSTRACT

A gas venting plug which separates entrained moisture has a gas escape nozzle and cooperating impingement plate, and a return duct for the separated liquid. The nozzle opening and return ducting are so dimensioned that the hydrostatic pressure in the return ducting is higher than the liquid capillary pressure in the nozzle.

4 Claims, 6 Drawing Figures

GAS VENTING BATTERY PLUG

This invention relates to gas venting plugs for storage batteries having liquid separators.

In the operation of storage batteries, especially during charging and over-charging, there takes place heavy gas evolution at the electrodes due to electrolytic decomposition of the water. The rising gas bubbles burst at the electrolyte surface, causing the formation of liquid droplets of various sizes. These liquid droplets penetrate to the outside of the battery through the gas venting plugs. There they are capable of producing corrosion of important structural elements. To prevent such escape of electrolyte droplets from the storage battery, various gas venting plugs have been devised.

For example, German Pat. No. 877,785 discloses a device for preventing the escape of liquid vapors from enclosed storage batteries. This involves a filter which is preferably made of porous materials and so positioned in the gas space of the storage battery and preferably in the plug which closes it that the gas containing this vapor must necessarily flow through it in the course of leaving the storage battery.

Such an arrangement suffers from significant drawbacks. If the pores of the filter have too great a diameter, small liquid droplets can traverse the filter material unimpeded and cause damage on the outside. Moreover, the liquid which is trapped in the filter can be expelled from the filter to the outside by the gas pressure. If a pore diameter is selected which is too small, that even the small liquid droplets are trapped. However, the pore system of the filter then becomes clogged by the trapped liquid. Substantial gas pressure are necessary in order to expel the liquid from the filter against the capillary pressure. Such increased pressures can lead to damage of the storage battery casing.

Accordingly, it is an object of the invention to provide gas venting plugs for storage batteries which provide substantially complete liquid separation from the gases evolved in the storage battery.

It is another object to provide such devices which also separate solid particles that may be entrained by the gas stream.

It is another object to provide such devices which do not cause development of dangerous overpressure in the storage battery casing.

It is another object to provide such devices which duct the separated liquid completely back into the electrolyte.

It is another object to provide such plugs which are capable of accommodating high gas evolution rates.

These and other objects which will appear are achieved in accordance with the invention by providing the gas venting plug with a nozzle and a cooperating impingement plate, and a return duct into the storage battery for the liquid separated at the impingement plate. The nozzle opening and return ducting system are so dimensioned that the hydrostatic pressure in the return duct is higher than the capillary pressure which a liquid droplet produces in the nozzle.

Preferably the return duct includes a porous body or is made of a porous body. The impingement plate, which preferably also forms the cover of the plug, can be provided with special arrangements to improve the draining of the separated liquid. It may also take the form of a freely movable plate resting upon the nozzle.

For further details, reference is made to the discussion which follows in the light of the accompanying drawings wherein FIG. 1 shows in elevation a cross-sectional view of a battery plug embodying the invention;

The same reference numerals are used in the different figures to denote corresponding elements.

Figure 1:
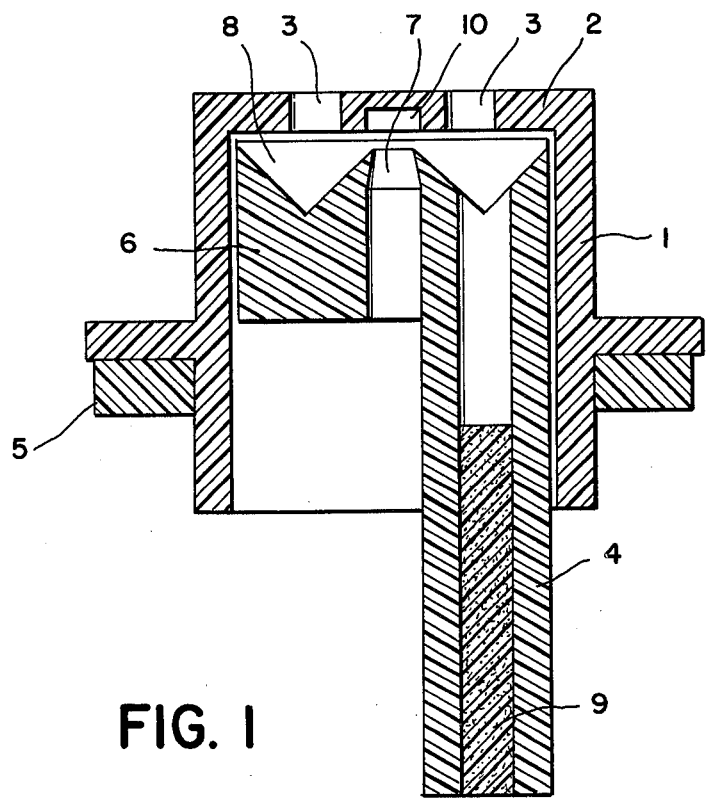
FIGS. 1a and 1b show, in plan cross-section, two different specific forms which the embodiment of FIG. 1 may take.

Referring to FIG. 1, the gas venting plug includes a shell 1 which may, for example, be an injection molded part of polyethylene or polystyrol. This plug may be screwed into an opening in the cell casing through a seal 5, for example, in conventional manner. The cover 2 of the shell also forms the impingement plate, at which the gas escaping through nozzle 7 is freed of liquid. Nozzle 7 is formed within an injection molded nozzle body 6, of polyethylene or polystyrol. The return duct is formed by depression 8 which may, for example, encircle nozzle 7 and by a tube 4 connected thereto which may if desired simply terminate in a small opening at its lower end. Care has to be taken that the hydrostatic pressure in the return duct is higher than the capillary pressure which a liquid droplet produces in separator nozzle 7. The liquid-laden gas stream from the storage battery cell passes through nozzle 7 and is deflected by impingement plate 2. By virtue of their inertia, the liquid droplets then land on the impingement plate and are separated. The separated liquid flows into the return duct. In order that the liquid shall drip back out of the return duct, the pressure of the liquid flowing back must be greater than the pressure of the gas which streams out through nozzle 7. The maximum pressure in the nozzle is the capillary pressure which arises when a liquid droplet closes this nozzle. The hydrostatic pressure corresponds to the height of the liquid column which correspondingly exists in the return duct.

It is particularly advantageous to create this hydrostatic pressure in the return duct 4 by introducing a porous body 9. The separated liquid penetrates into the capillaries of porous body 9 and is ducted back into the electrolyte through this capillary system. The length of porous body 9 is so chosen that the hydrostatic pressure of the liquid which is return flowing is greater than the capillary pressure caused by a liquid droplet at nozzle 7. In the embodiment of FIG. 1, the porous body consists preferably of a wettable synthetic web, made, for example, of polyethylene, polypropylene, or polyvinylchloride. However, porous body 9 may also be made of a sintered synthetic plastic material, ceramic or glass. The pore size of this body should be between about 10 and 100 microns, e.g. between about 40 and 70 microns. The opening of the nozzle should have a diameter of about 0.4 to 1.5 millimeters, and preferably of about 0.6 to 1 millimeter. Smaller diameters are undesirable because, when larger drops penetrate into the nozzle, excessive capillary pressure would then arise, so that a return duct system with a height greater than 7 centimeters would be needed. To avert this, it is also possible to make the nozzle of a particularly hydrophilic material, e.g. of a ceramic material or a specially-treated synthetic plastic and characterized by a diameter of about 1.0 to 1.5 millimeters, e.g. about 1.3 millimeters. Due to the hydrophilic properties of the nozzle material, the adhering liquid itself, then causes a constriction in the region of the nozzle opening, so that effective nozzle opening is reduced. The exit velocity of the gases, or liquid vapor, is then very high and the separation of the liquid is correspondingly improved.

Nozzle diameters which are too great cause too low a gas exit velocity with the consequence that smaller liquid droplets, particularly, have too low an inertia to reach the impingement plate upon deflection of the gas stream and are therefore not separated.

The distance between nozzle opening and impingement plate should be in the range of about 0.1 to 1 millimeter. This distance is primarily determined by the requirement that the well-defined gas stream exiting from the nozzle should not have its cross-section, as determined by the diameter of the nozzle, greatly enlarged by the time it reaches the impingement plate.

The region in which the gas stream reaches impingement plate 2 may desirably be given a particular configuration which improves the operation of the separator. For example, in the area of the nozzle, a recess 10 may be provided in impingement plate or in the cover of the plug. The diameter of this recess 10, which may have the same shape and be positioned concentrically with the nozzle itself, is greater than the nozzle diameter. For example, if the nozzle diameter is 0.7 millimeters, then the diameter of recess 10 may be approximately 3 millimeters. The depth of recess 10 may, for example, be about 2 millimeters. In operation, a liquid droplet tends to form in this recess and subsequent separation then occurs at the surface of that liquid. This tends to prevent the formation of electrolyte crystals which, otherwise, could interfere with operation after extended periods of use. Deposits which do form in the recess are also flushed away by these liquid drops and become unable to interfere with the effectiveness of the system. In particular, this insures that solid particles entrained in the gas stream do not become deposited but are flushed out of the vicinity of the nozzle.

Figure 1A:
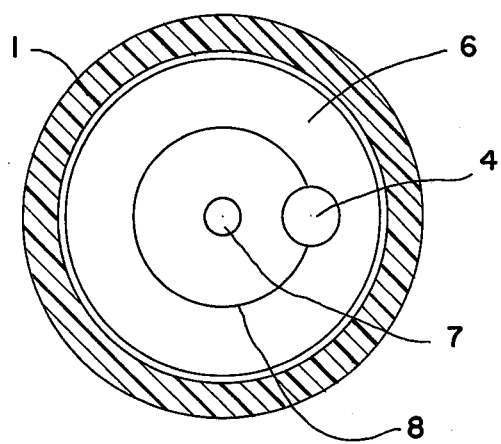
Figure 1B:
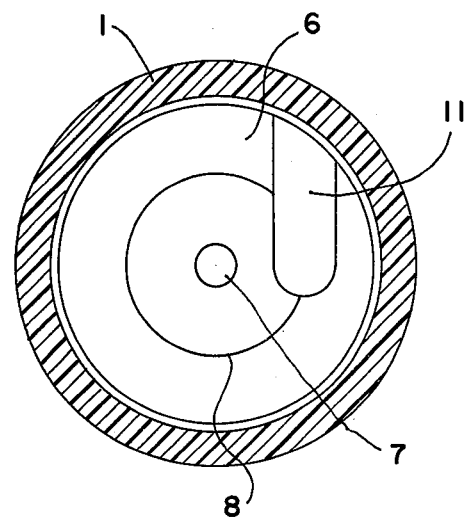

Referring to FIG. 1a, return duct 4 may take the form of a hole in the nozzle body 6 itself with an attached return flow tube. Alternatively, as shown in FIG. 1b, a slot 11 can be formed within nozzle body 6 into which porous body 9 is inserted. Such a construction of the nozzle body is particularly easy to produce. Obviously, it is not essential that nozzle 7 be positioned centrally within the separator plug.

Figure 2:
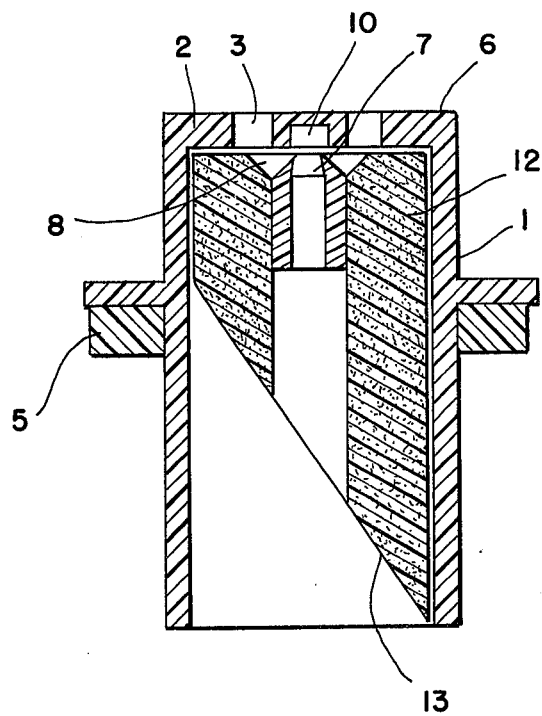
FIG. 2 shows an elevation cross-section of another embodiment of the invention; and, FIGS. 3 and 3a show, in elevation and plan cross-section, respectively, still another embodiment of the invention.

Referring to FIG. 2, the embodiment shown therein utilizes a nozzle 7 and nozzle body 6 constituted by an insert in what may, for example, be a cylindrical porous body 12. Here too it is necessary that the hydrostatic pressure in the return duct, i.e. in porous body 12 which forms that return duct, the greater than the maximum capillary pressure at the nozzle. To improve the run-off, the lower end 13 of porous body 12 may be made on a diagonal. The liquid which is separated at cover 2, i.e. at the impingement plate, flows into annular recess 8 which surrounds nozzle 7 and is ducted away through the porous body 12. Such a porous body 12 may consist of materials such as those previously mentioned. It may also, for example, be formed of a spiral made of a strip of hydrophilic synthetic plastic. If desired, the separate nozzle body may be omitted and the nozzle formed directly in the porous body itself.

Figure 3:
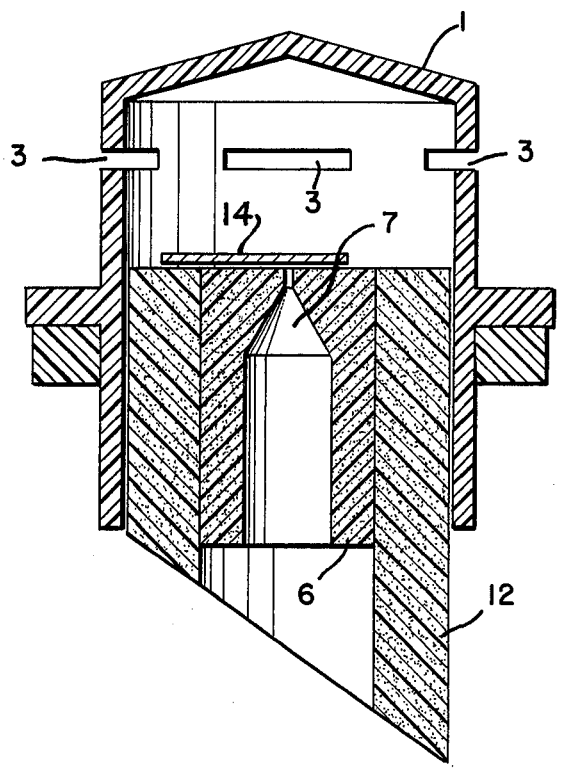

Another embodiment of the gas venting plug is shown in FIG. 3, to which reference may now be had. In it, too, container 1 is provided with a nozzle body 6 with nozzle 7. This nozzle could, if desired, also be provided in the porous body itself. The nozzle outlet is covered by a small plate 14. This plate 14 is so dimensioned that, regardless of position, it covers the nozzle and also partially covers porous body 12. Freely movable impingement plate 14 is slightly lifted by the escaping gas and the liquid droplets are separated from the gas deflected by the plate by virtue of their inertia. Since the plate covers porous body 12 only partially, the cleaned gas can escape without impediment. The plate itself should be as light as possible, preferably having a weight of about 0.1 gram, and particularly of 0.01 to 0.1 gram. It consists preferably of a hydrophilic material in order to avert as much as possible the bouncing off of liquid droplets. In this arrangement, too, the liquid separated at the impingement plate is conducted back into the porous body and thence into the electrolyte.

Figure 3A:
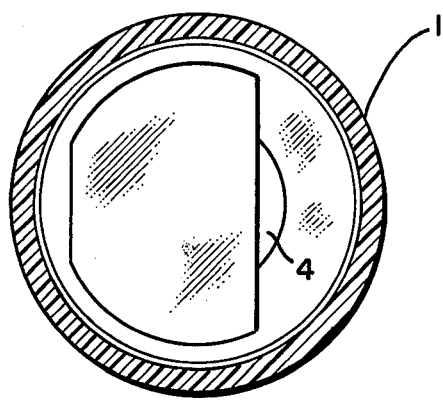

Plate 14 itself may, as shown in FIG. 3a, be in the form of a strip-like segment of a circle. Plate 14 may then be displaced by a very low gas pressure becuase only a small turning moment needs to be applied due to the small lever arm. In addition to the particular configuration shown for this plate, it will be understood that various other configurations may be used.

Gas venting plugs of this type are especially effective. By way of illustration, a plug whose porous body has a diameter of about 20 millimeters and a length of about 40 millimeters with a pore diameter of about 30 to 40 microns, is suitable for a lead storage battery with a capacity of about 300 ampere-hours. For such a case, the plate should weight about 0.1 gram and the nozzle diameter should be about 0.7 millimeters. During overcharging at about 10 amperes, about 90% of all liquid droplets having a diameter between about 1 and 10 microns are separated from the gas.

Gas venting plugs of this type are appropriate for all storage batteries having acid or alkaline electrodes and characterized by a high gas evolution rate during charging or use. They insure separation of the liquid droplets entrained in the gas stream and thereby reduce the environmental pollution attributable to electrolyte escape and also increase the intervals between servicing of the storage batteries.

I claim:

1. A storage battery gas venting plug having a liquid separator, and comprising;

a nozzle;

an impingement plate positioned to cooperate with the nozzle;

means for ducting the liquid separated at the impingement plate back into the battery, the nozzle outlet and ducting means being so proportioned that the hydrostatic pressure in the ducting means is higher than the capillary pressure developed in the nozzle by a liquid droplet, and the impingement plate being in the form of a freely movable flat plate resting on the nozzle outlet.

2. The plug of claim 1, wherein the plate is shaped so as to cover the nozzle exit regardless of the rotational positioning of the plate.

3. The plug of claim 1, wherein the plug has annular symmetry and the plate is in the shape of a strip segment of a circle.

4. The plug of claim 1, wherein the plate is of hydrophilic material.

* * * * *